United States Patent [19]

Swartz et al.

[11] Patent Number: 5,412,193
[45] Date of Patent: May 2, 1995

[54] MOBILE POINT-OF-SALE SUPERMARKET CHECKOUT SYSTEM

[75] Inventors: Jerome Swartz, Old Field; Robert Sanders, Wading River, both of N.Y.

[73] Assignee: Symbol Technologies, Inc., Bohemia, N.Y.

[21] Appl. No.: 65,304

[22] Filed: May 24, 1993

Related U.S. Application Data

[60] Continuation-in-part of Ser. No. 863,259, Apr. 3, 1992, abandoned, which is a division of Ser. No. 699,417, May 13, 1991, Pat. No. 5,191,197, which is a continuation-in-part of Ser. No. 193,265, May 11, 1988, Pat. No. 5,144,120.

[51] Int. Cl.⁶ .............................................. G06K 15/00
[52] U.S. Cl. ...................................... 235/383; 186/61
[58] Field of Search .................. 235/383, 385; 186/27, 186/40, 42, 45, 47, 57, 59, 56, 61

[56] References Cited

U.S. PATENT DOCUMENTS

| | | | |
|---|---|---|---|
| D. 152,602 | 2/1949 | Dimling | D6/46 |
| 3,836,755 | 2/1973 | Ehrat | 235/617 R |
| 3,897,855 | 8/1975 | Patterson | 186/45 X |
| 3,990,540 | 11/1976 | Alesaire et al. | 186/61 |
| 4,071,740 | 5/1976 | Gogulski | 235/431 |
| 4,274,567 | 6/1980 | Sawyer | 224/42.43 |
| 4,373,133 | 12/1980 | Clyne | 235/383 |
| 4,443,961 | 4/1984 | Gilroy | 40/308 |
| 4,656,344 | 4/1987 | Mergenthaler et al. | 235/385 X |
| 4,779,706 | 10/1988 | Mergenthaler | 235/383 X |
| 4,789,048 | 12/1988 | Clamer et al. | 186/61 |
| 4,929,819 | 12/1988 | Collins | 235/383 |
| 4,930,848 | 1/1989 | Knowles | 350/6.6 |
| 4,936,471 | 6/1990 | Walter | 211/189 |
| 5,072,957 | 12/1991 | Graebe, Jr. | 280/33.992 |
| 5,086,960 | 2/1992 | Schwietzer | 224/277 |
| 5,149,947 | 9/1992 | Collins, Jr. | 235/383 X |
| 5,151,581 | 9/1992 | Kirchever et al. | 235/467 |
| 5,176,392 | 1/1993 | Graebe, Jr. | 280/33.992 |
| 5,250,789 | 10/1993 | Johnsen | 235/383 |

FOREIGN PATENT DOCUMENTS

| | | |
|---|---|---|
| 0513530 | 11/1992 | European Pat. Off. . |
| 2555339A | 9/1983 | France . |
| WO90/6051 | 12/1990 | France . |

Primary Examiner—John Shepperd
Assistant Examiner—Michael G. Lee

[57] ABSTRACT

A method for operating a point-of-transaction system carried by a fixture to efficiently use areas of a store during periods of differing intensity of usage, by placing the fixture at a prescribed area of the store and configuring the point-of-transaction system with point-of-transaction terminal components for processing items to be purchased by customers during a period of relatively intense usage. During a period of relatively less intense usage, the fixture is reconfigured as a display stand by relocating at least some of said point-of-transaction components from the fixture, and overlying remaining point-of-transaction components of the fixture with a display surface. During intense usage periods the components are located on a shelf overlying the fixture. The reconfiguration includes repositioning the shelf together with the remaining components to a location beneath the display surface within the fixture. The shelf is mounted on a slidable column above the fixture, so that reconfiguring includes detaching the shelf from the column, followed by lowering the slidable column into the fixture.

18 Claims, 6 Drawing Sheets

FIG. 1A
FIG. 1B
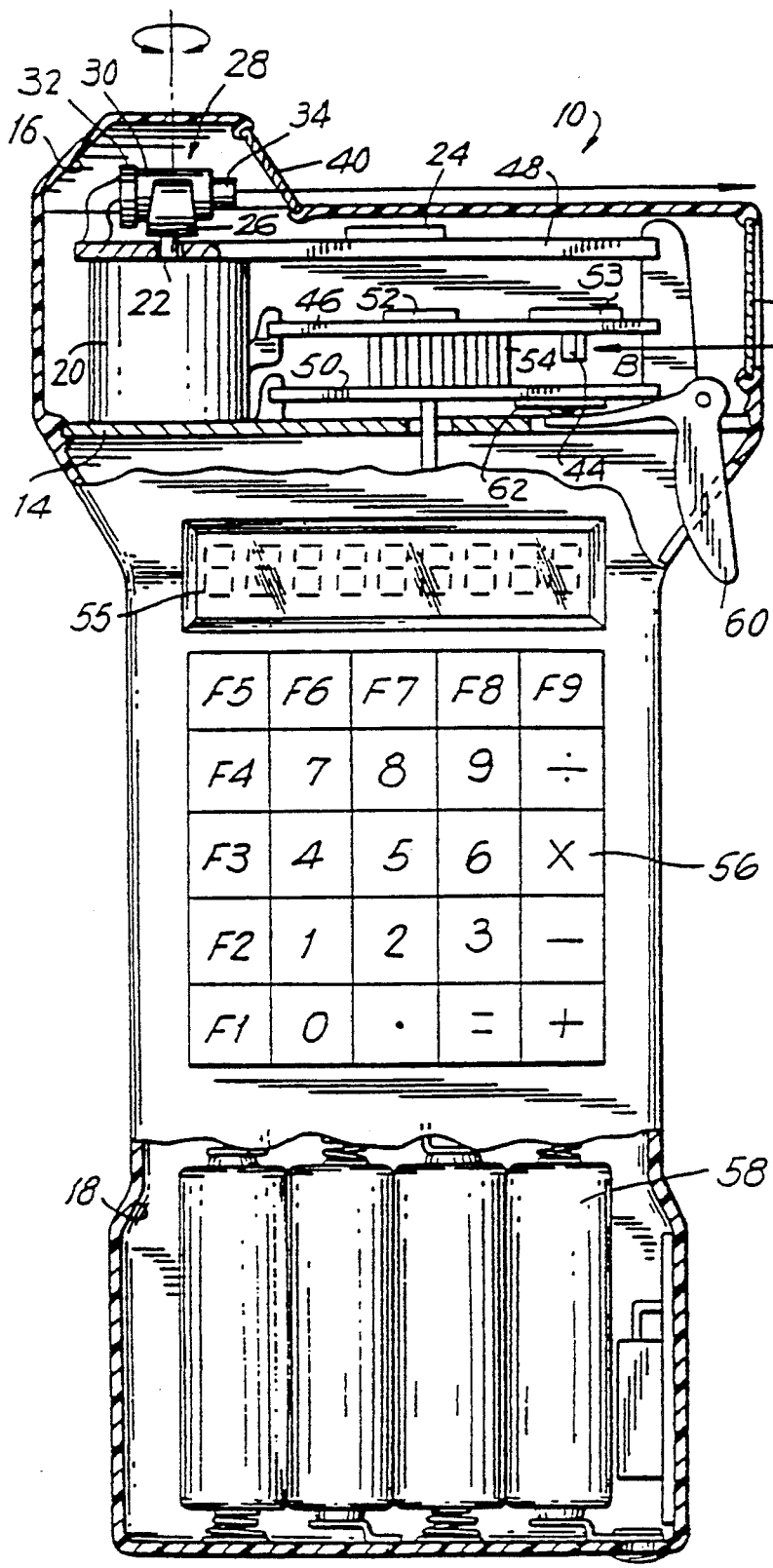
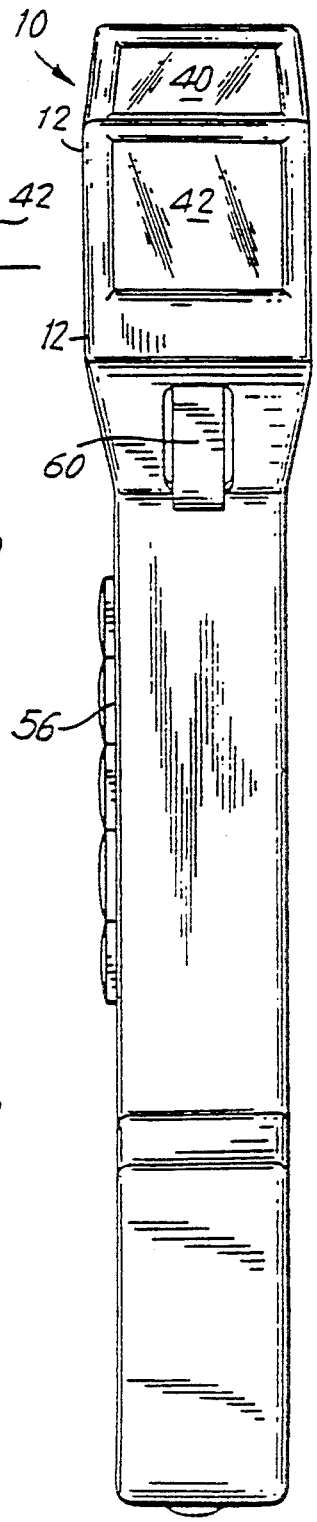

MOBILE POINT-OF-SALE SUPERMARKET CHECKOUT SYSTEM

CROSS-REFERENCE TO RELATED APPLICATIONS

This application is a continuation in part of application Ser. No. 07/863,259, filed Apr. 3, 1992, is now abandoned, which, in turn, is a divisional of application Ser. No. 07/699,417, filed May 13, 1991, now U.S. Pat. No. 5,191,197, which, in turn, is a continuation-in-part of application Ser. No. 07/193,265, filed May 11, 1988, now U.S. Pat. No. 5,144,120.

BACKGROUND OF THE INVENTION

1. Field of the Invention

This invention relates to point-of-sale, checkout systems and, more particularly, to a mobile system encompassing all necessary elements to conduct a merchandise transaction process in a retail supermarket environment, with the unique ability of being easily transported from location to location.

2. Description of Related Art

Shopping patterns in supermarkets, both domestic and abroad, tend to be fairly predictable following well-defined routines that no doubt can be traced to the traditional "pay day" in a given geographical locale. Consequently, there are typically several peak shopping days within the given calendar week in which a significantly large percentage of the food retailers' overall business is conducted.

This cyclical shopping behavior results in large numbers of consumers in the supermarket at a given time, necessitating the existence of ample checkout lanes, commonly referred to as "check stands" to handle such volume in a timely fashion The drawback to this situation is that during the majority of the calendar week a number of check stands go unused.

As a food retail operation's profitability is often measured in terms of revenue per square foot, one can clearly see that unproductive space, namely, unattended check stands, is detrimental to the profitability of the business operation.

Traditionally, the check stand in the supermarket is a stationary device that is fixed in place by some means of physical attachment to a floor. This check stand normally includes a motorized drive belt to transport a shopper's goods to a point easily accessible to an operator. This check stand also commonly provides a mounting area for a laser scanner. A computing device, commonly referred to as a point-of-sale (POS) terminal, is usually mounted on its own pedestal, directly next to the check stand. These two items together are commonly referred to as a "checkout". This checkout configuration is large and virtually impossible to move once it is in place.

Laser scanners of the type exemplified by U.S. Pat. Nos. 4,251,798; 4,360,798; 4,369,361; 4,387,297; 4,593,186; 4,496,831; 4,409,470; 4,460,120; 4,607,156; 4,673,803; 4,736,095; 4,758,717; 4,816,660; 4,808,804; 4,816,661; 4,760,248; 4,871,904; 4,806,742; 4,845,350, as well as U.S. application Ser. Nos. 148,669 and 147,708—all of said patents and patent applications being owned by the assignee of the instant invention and being incorporated by reference herein—are known and are operative to read indicia having parts of different light reflectivity, e.g., bar code symbols, particularly of the Universal Product Code (UPC) type.

SUMMARY OF THE INVENTION

1. Objects of the Invention

It is an object of the present invention to provide a fully functional supermarket checkout in a compact, single platform that features the ability to be easily transported from location to location for the purpose of allowing a food retailer to utilize the area occupied by unproductive checkouts, during non-peak shopping periods, as a merchandising area, for the display and distribution of saleable products.

Another object of this invention is to enable a customer to check his or her goods out of a store without requiring an operator's assistance.

A further object of this invention is to provide a mobile point-of-sale system which is compact in size, light in weight, reliable in use, and relatively inexpensive to assemble and manufacture.

Still another object of this invention is to enable a person to easily move a mobile point-of-sale system to any desired location.

2. Features of the Invention

In keeping with these objects, and others which will become apparent hereinafter, one feature of this invention resides, briefly stated, in a mobile, point-of-transaction system for processing items, comprising a wheeled carriage for transporting the system from location to location; a scanning terminal mounted on the carriage for joint movement therewith, and operative for electro-optically reading coded indicia on items presented to the terminal, and for determining transaction data for the items; and transaction means responsive to the terminal and also mounted on the carriage for joint movement therewith, and operative for processing the transaction data for the items to complete the transaction.

In the preferred embodiment, the carriage has a countertop and a window mounted on the countertop. The terminal includes means for scanning a light beam in a scan pattern through the window.

Also mounted on-board the carriage are a keyboard for manually entering data relating to an item being processed, a display for displaying data relating to the item being processed, a scale for weighing the item to obtain a weight for an item being weighed, a printer for printing a receipt of the transaction, a credit card reader for processing electronic payment for the items, a cash register for processing cash payment for the items, a holder for holding a shopping bag in an upright orientation, and a handle for enabling a person to push the carriage.

When the system is not in use, it is stored with the aid of a storage cover which overlies and encloses some of the above components, such as the keyboard and the display, which advantageously are mounted on sliding supports, as well as the window and the scale. With the storage cover in place, the system can be used as a merchandising display counter.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIG. 1A is a partly broken-away, partly sectioned side view of a hand-held laser scanner for reading indicia;

FIG. 1B is an end view of FIG. 1A;

DETAILED DESCRIPTION OF THE PREFERRED EMBODIMENTS

Figure 2:
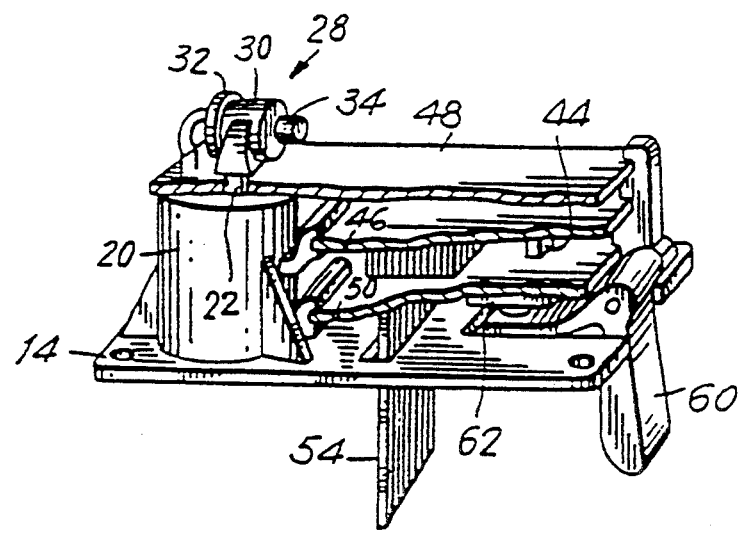
FIG. 2 is a front perspective view of a laser scanner module used in the system of FIG. 1A.

Referring now to the drawings, reference numeral 10 in FIGS. 1A and 1B generally identifies an arrangement in a scanner system of the type generally described in the above identified patents and patent applications, the entire contents of all of which are hereby incorporated by reference herein, for reading symbols, particularly UPC bar code symbols. As used in this specification and the following claims, the term "symbol" is intended to be broadly construed and to cover not only symbol patterns composed of alternating bars and spaces, but also other patterns, as well as alpha-numeric characters and, in short, any indicia having portions of different light reflectivity.

The arrangement 10 comprises a hand-held housing 12 having a base 14 which subdivides the interior of the housing into an upper half 16 and a lower half 18. A lightweight, high-speed, miniature scanning motor 20 similar to that described in U.S. Pat. No. 4,496,831 is mounted on base 14. The motor 20 has an output shaft 22 which is repetitively driven in alternate circumferential directions about an axis along which the shaft extends over arc lengths less than 360° in each direction. Structural, functional and operational aspects of the motor 20 and of control circuitry 24 for the motor are set forth in detail in U.S. Pat. No. 4,496,831 and, hence, for the sake of brevity, will not be repeated herein.

One difference between the motor 20 and the motor of U.S. Pat. No. 4,496,831 is the superstructure that is mounted on the output shaft 22. Instead of a planar mirror as taught by said patent, the invention proposes, in FIG. 1A, mounting a generally U-shaped support 26 at the end of the shaft 22, and mounting a laser/optics subassembly 28 on the support 26. The subassembly 28 and the support 26 are jointly oscillated and turned with the shaft 22.

Figure 3:
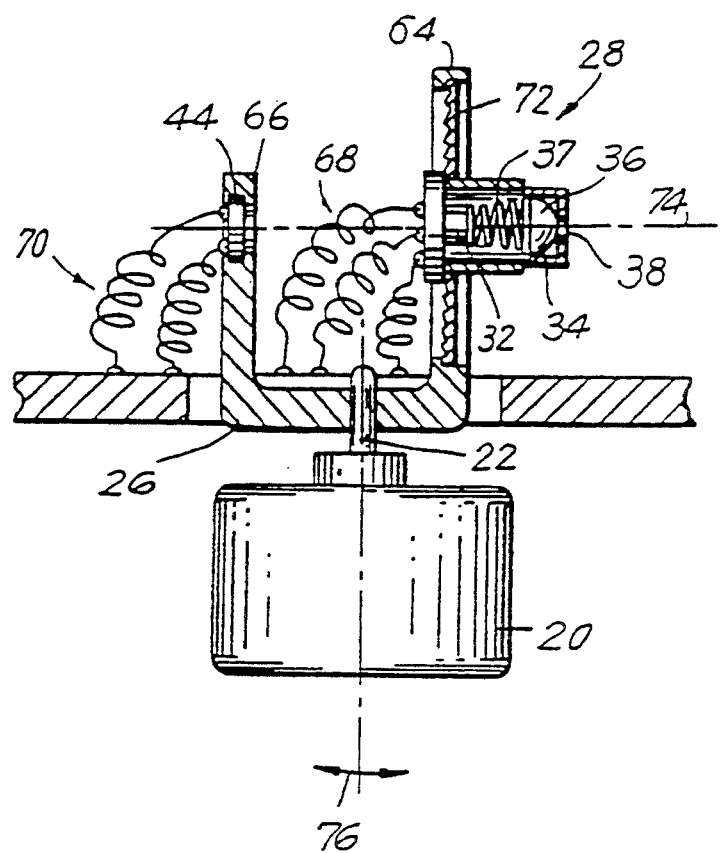
FIG. 3 is a partly sectioned side view of another scanner module.

The subassembly 28 includes an elongated hollow tube 30, a laser diode 32 fixedly mounted at one axial end region of the tube 30, a lens barrel 34 mounted at the opposite axial end region of the tube 30, and a focusing lens 36 mounted within the barrel (see FIG. 3). The focusing lens 36 is preferably a plano-convex lens, but may be spherical, convex or cylindrical as well. The barrel 34 has an end wall formed with an aperture stop 38 which is an opening extending through the end wall. The barrel 34 is mounted for longitudinal telescoping movement within and along the tube 30. The lens 36 is situated adjacent the end wall of the barrel and is mounted for joint movement with the barrel. The position of the barrel and, in turn, of the lens relative to the diode is fixed typically by gluing or clamping, at the assembly site so that a known distance between the lens and the aperture stop, on the one hand, and between the lens, the aperture stop and the diode, on the other hand, is obtained. A coil spring 37 (see FIG. 3) is located within and extends along the barrel and tube, and has one coil end bearing against the diode, and another coil end bearing against a planar side of the lens. The spring urges the lens against the end wall having the aperture stop, thereby fixedly locating the lens relative to the aperture stop.

The subassembly 28, per se, forms no part of this invention and, in fact, is described and claimed in U.S. Pat. No. 4,816,660 to which reference can be had for further structural, functional and operational aspects of the subassembly. It is sufficient for this invention to understand that the subassembly 28 includes a solid-state laser diode 32 operative for propagating and generating an incident laser beam, either in the invisible or visible light range, and the combination of a focusing lens and an aperture stop together operative for focusing the laser beam to have a beam cross-section or beam spot of a certain waist size within a range of working distances relative to the housing 12. The focused beam passes through the aperture stop 38 and through a scan window 40 on the housing in the vicinity of a reference plane located exteriorly of the housing within the range of working distances along an outgoing optical path.

During the alternate, repetitive oscillations of the shaft 22, the support 26 and the subassembly 28 likewise participate in this oscillatory movement, thereby causing the beam spot to be swept in an arc whose center of curvature is located at the diode across the symbol at the reference plane and to trace a curved scan line thereat. Hence, to effect sweeping of a beam spot across a symbol, the laser diode 32 and the optical components are jointly turned as a unitary structure about an axis parallel to the reference plane.

A portion of the light reflected off the symbol passes along a return path through a second window 42 on the housing in the direction of arrow B to a photodetector 44 for detecting the variable intensity of the returning portion of the reflected laser light over a field of view, and for generating an electrical analog signal indicative of the detected variable light intensity. In the FIG. 1A embodiment, the photodetector 44 is stationarily mounted on the printed circuit board 46. Printed circuit boards 48 and 50 at either side of board 46 contain signal processing circuitry 52 and microprocessor control circuitry 53 for converting the analog electrical signal to a digital signal, and for processing the digital signal to data descriptive of the symbol being read. Details of the signal processing and microprocessor control circuitry can be had by reference to the above-identified patents and applications.

A two-part multi-wire plug-in cable connector 54 has one part electrically connected to the signal processing and microprocessor control circuitry and another part electrically connected to a flexible multi-wire cable 54 connected to a display 55 and a keyboard 56. A rechargeable battery pack 58 supplies power to the laser diode and the electrical circuitry in the housing. By moving only the laser diode and the optical component relative to the stationary photodetector, power from the battery pack is conserved.

Means for initiating reading may advantageously include a trigger 60 mounted on the housing 12. The trigger extends in part outwardly of the housing to be manually actuated by a user who is holding the housing 12 in his hand. The trigger is operatively connected through trigger switch 62 and actuates the laser diode 32, the motor 20, the photodetector 44, the signal processing circuitry 52 and the control circuitry 53 to initiate a reading of the symbol. The trigger is actuated once for each symbol to be read, each symbol in its respective turn. Once the control circuitry determines that the symbol has been successfully decoded, the control circuitry terminates the reading of the symbol and deactuates the previously actuated components in the housing and readies the system for the next symbol.

FIG. 2 illustrates the various electrical, mechanical and optical components assembled as a modular unit prior to mounting in the upper half 16 of the housing 12 of FIGS. 1A, 1B. The electrical circuitry on the printed circuit boards 46, 48, 50, as well as on base 14, has been omitted from FIG. 2 for the sake of clarity.

Turning now to FIG. 3, like parts with that of FIG. 1A have been identified with like reference numerals. The oscillating motor 20, once again, has an output shaft on which a generally U-shaped support 26 is mounted. A laser/optics subassembly 28 is mounted on one leg 64 of the support. A photodetector 44 is mounted on another leg 66 of the support. Coiled tensile wire groups 68, 70 connect the diode 32 and the photodetector 44 to the non-illustrated electrical circuitry on printed circuit board 48. Although coiled wires have been illustrated, other types of electrical connectors, e.g., flat cable, could be employed. A collecting lens 72 is mounted on leg 64 and coaxially surrounds subassembly 28. The lens 72, the subassembly 28 and the photodetector 44 all have a common boresight or optical axis 74 along which the optical and return paths are co-linear, and are all oscillatable as a unit in alternate circumferential directions about the axis along which shaft 22 extends.

In the above embodiments, the scanning arrangement is very compact in size. This allows the arrangement to be fabricated as a module that can be installed in many different types of laser scanning systems. The module advantageously comprises a laser/optics subassembly mounted on a support such as a reciprocating scan component, together with a photodetector, all of which are connected to an electrical connector to enable the module to be electrically connected to other electrical components.

Figure 4:
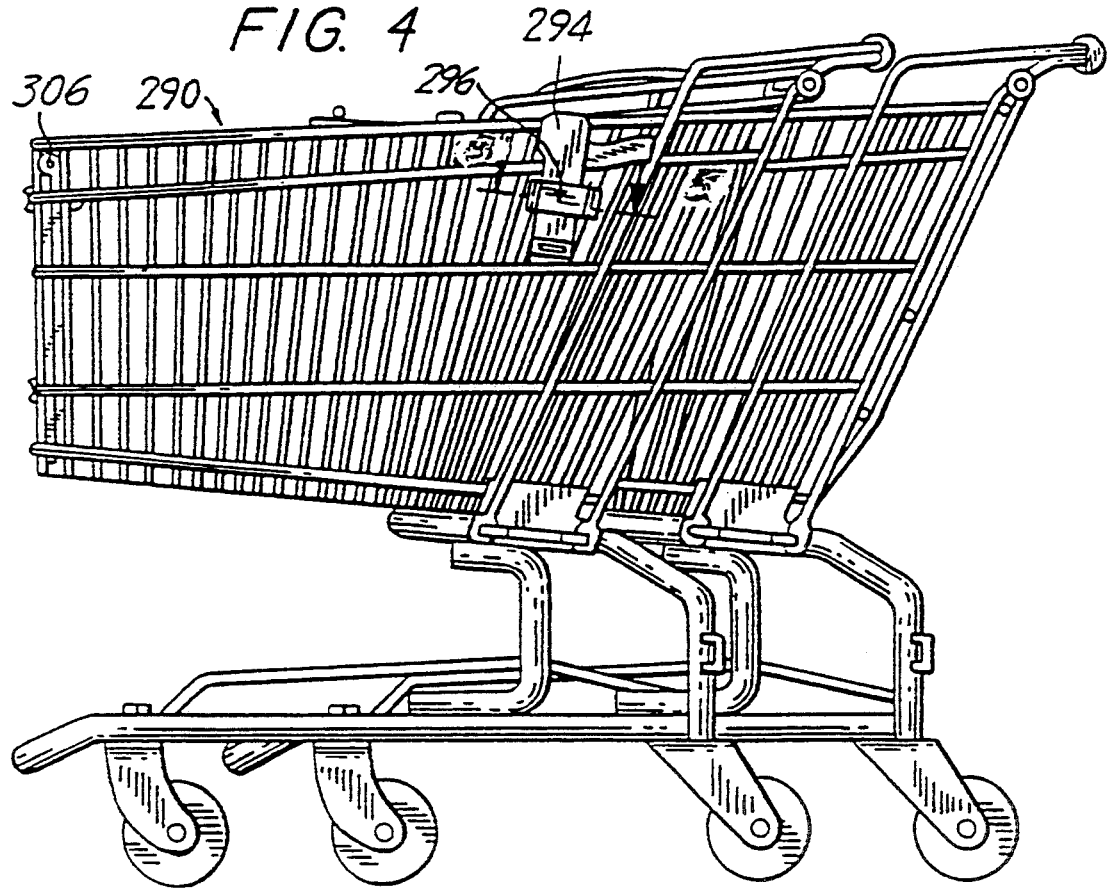
FIG. 4 is a side view of a hand-held laser scanner mounted on a shopping cart.
Figure 5:
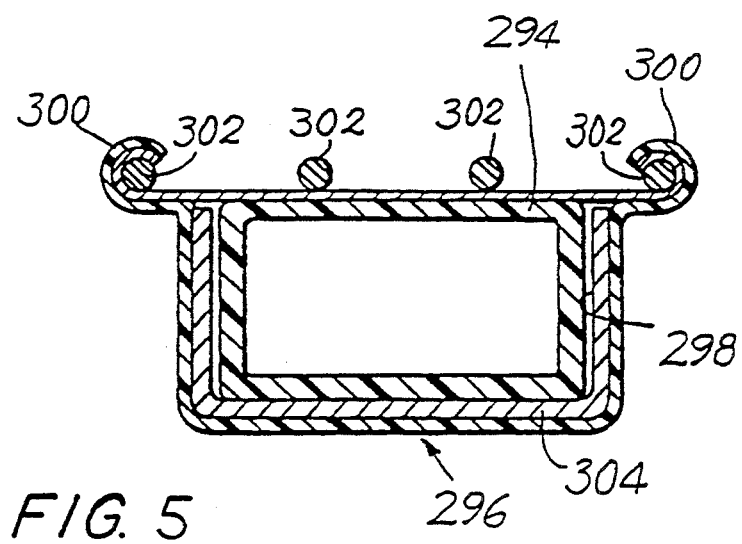
FIG. 5 is an enlarged sectional view taken on line 5—5 of FIG. 4.

FIG. 4 depicts a conventional, wire-frame shopping cart 292 equipped with the scanning arrangement or module incorporated in a hand-held head 294 that has a gun-shaped configuration. As best shown in FIG. 5, a snap-on holder 296, preferably constituted of a resilient plastic material, has walls bounding a compartment 298 in which a barrel of the gun-shaped head 294 is stored. The holder 296 has legs 300 which snap over and resiliently grip individual wires 302 of the wire-frame cart 292. A rubber-like, shock-absorbing pad 304 is mounted within the compartment 298 to protect the barrel of the head 294 from being nicked and damaged during withdrawal and replacement of the head relative to the holder.

As also shown in FIG. 4, the holder is mounted to the rear of the cart at one of the side walls, thereby avoiding damage to the holder and/or the head when multiple shopping carts are nested together. A fold-up display 306 is mounted at the front of the cart to display data concerning a product bearing a symbol being scanned.

Figure 6:
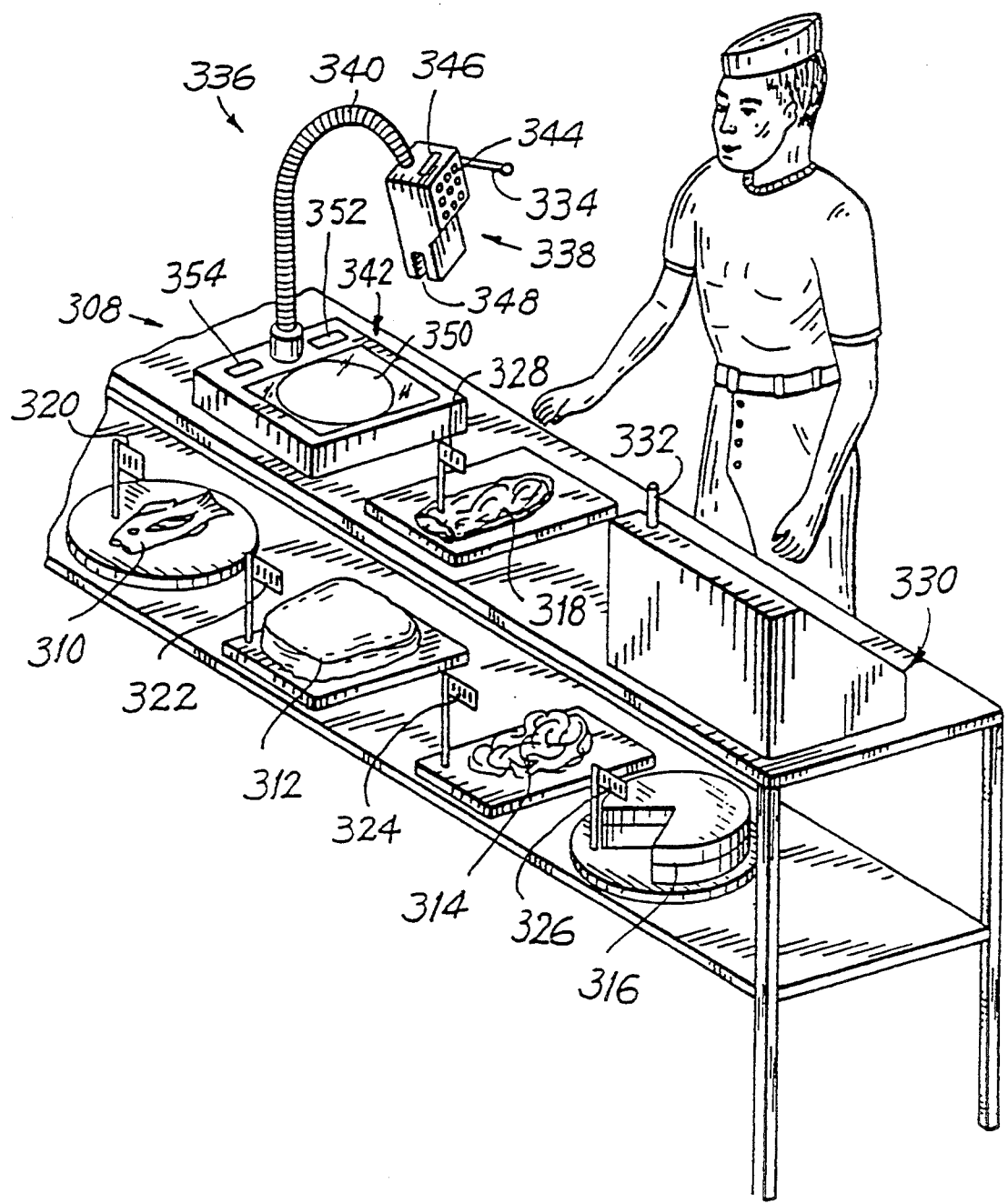
FIG. 6 is a perspective view of a countertop scanning system at a point-of-transaction site.

Turning now to FIG. 6, a point-of-transaction counter 308, such as an appetizing counter, has a plurality of appetizing products such as fish 310, meat 312, potato salad 314, cheese 316, salami 318, just to mention a few exemplary choices. Each product is associated uniquely with a bar code symbol. For example, flags 320, 322, 324, 326, 328 bear unique coded symbols which, when electro-optically scanned, decoded and read, respectively identify the products 310, 312, 314, 316, 318.

The counter 308 also includes a cash register 330 of the type having a conventional cash drawer, a keyboard, a display, and a paper receipt tape assembly, together with an antenna 332 which is in radio frequency communication with an antenna 334 of a countertop scanner 336. A clerk stands behind the counter 308 and operates the scanner 336 and the cash register 330.

The scanner 336 includes a head 338 mounted at one end of a semi-rigid, bendable column 340 whose other end is connected to a base 342. The head 338 is equipped with a keyboard 344, a display 346 and a card reader having a slot 348 through which magnetically encoded customer cards, e.g., debit, credit or smart cards, are passed. The base 342 is equipped with a weighing scale 350, an electronic surveillance tag deactivator 352, and a printer having an opening 354 through which paper tape and/or machine-readable and/or human-readable labels are passed. The scale has a weighing platform in the plane of the top wall of the base 342. The deactivator is mounted within the base and is operative to change the state of a tag associated with a product to deter theft. The printer is also mounted within the base, and ejects tape and/or labels for application to a product through opening 354.

In use, a customer walks up to the counter 308 and requests a portion of a particular product, such as salami 318. The clerk cuts and weighs the portion on scale 350 and aims the scanner 338 at the flag 328 to advise the system that the product being weighed is, in fact, salami. This optical identification of the product prevents operator error as is common with manual entry of product identification codes in known systems.

With the product and its weight known, a local data base having price per unit weight information is interrogated, and a label is printed by the printer 354. The label is applied to the salami portion, typically on a paper wrapping therefor.

During the weighing process, the clerk could check the display 346 to see that the correct product was identified, or could manually access the keyboard. After the label is applied to the product, a credit card can be passed through the reading slot 348 to charge the customer's account.

The scanner 338 need not be in wireless communication with the cash register 330, but could be hard-wired thereto. Also, the scanner 338 need not be mechanically supported by the base 342, but could be mounted on a post or analogous support, fixed or manipulatable.

This invention is not intended to be limited to food counters, since any merchandise can be optically read in the manner described above. In a retail situation such as a clothing store, the tag deactivator 354 would be more useful.

Figure 7:
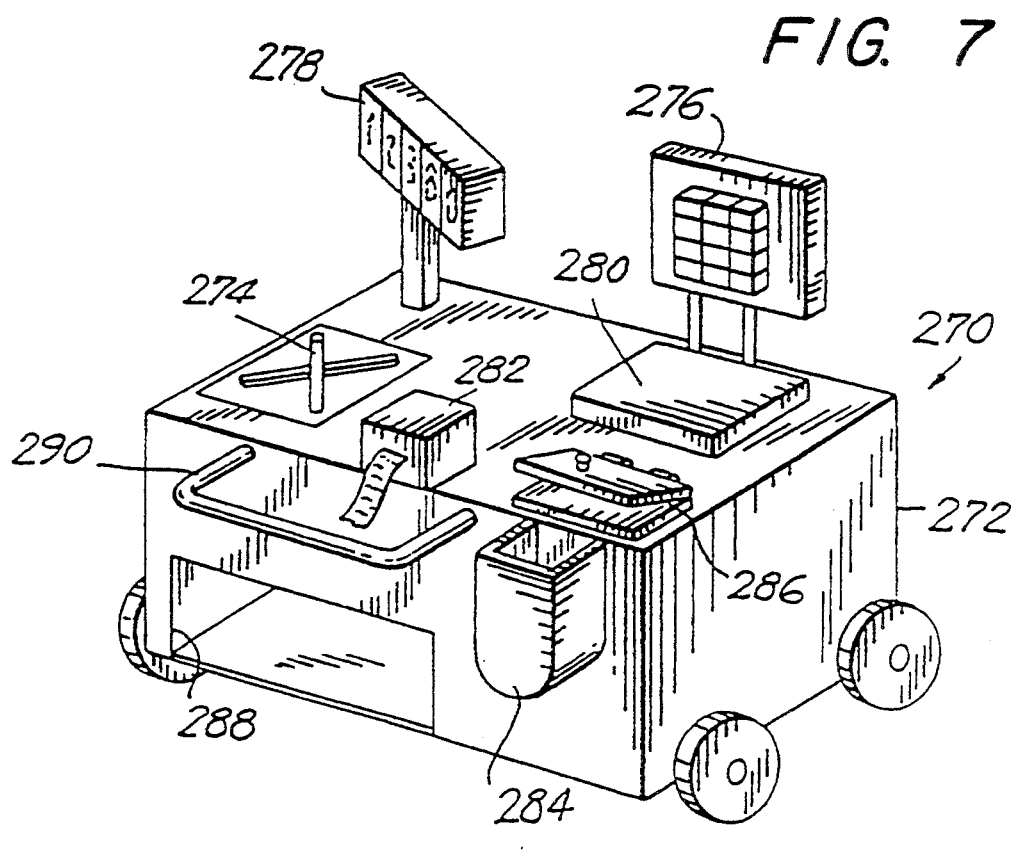
FIG. 7 is a perspective view of a mobile checkout stand for use with a laser scanner.

FIG. 7 illustrates a mobile checkout stand in which the aforementioned scanning arrangement or module is incorporated, together with other point-of-transaction accessories. The stand 270 includes a wheeled carriage 272 which supports the scanning arrangement underneath an X-shaped window 274 located in a planar top wall of the carriage, a keyboard 276 for entering data relating to a product bearing the symbol being scanned, an overhead display 278 for displaying data relating to the product, a weighing scale 280 for weighing the product, a printer 282 for printing a paper tape receipt or labels for application to a product, a bag support 284 for holding bags in an upright orientation suitable for bagging the products, a bag sealer 286 for closing a plastic bag by heat, adhesive or the like, and a storage compartment 288 for temporarily storing bagged products. A push handle 290 enables a customer to push the stand from place to place, typically along aisles of a retail store.

Figure 9:
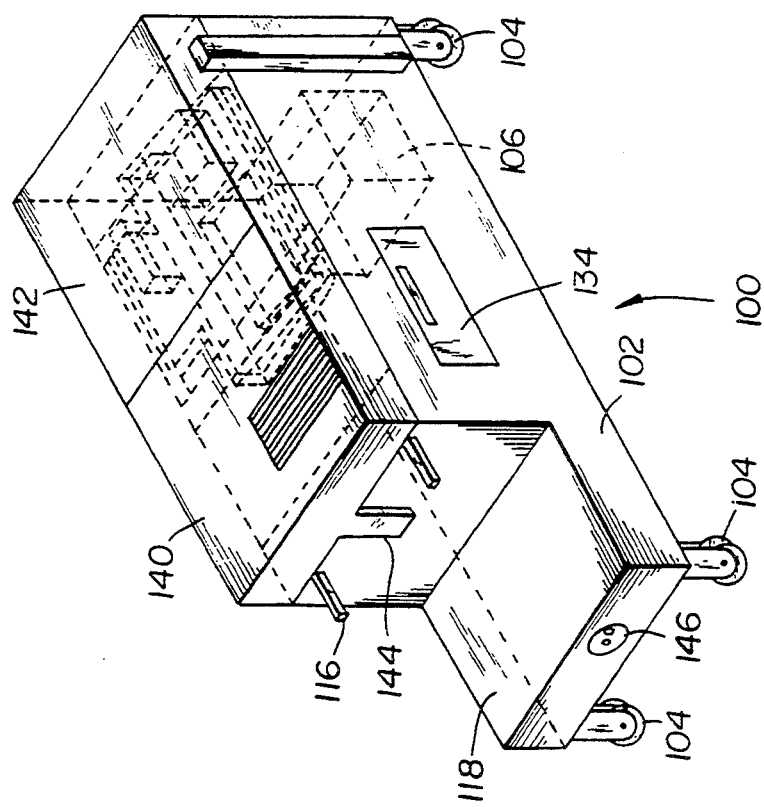
FIG. 9 is a perspective view of the stand of FIG. 8 after being stored.
Figure 8:
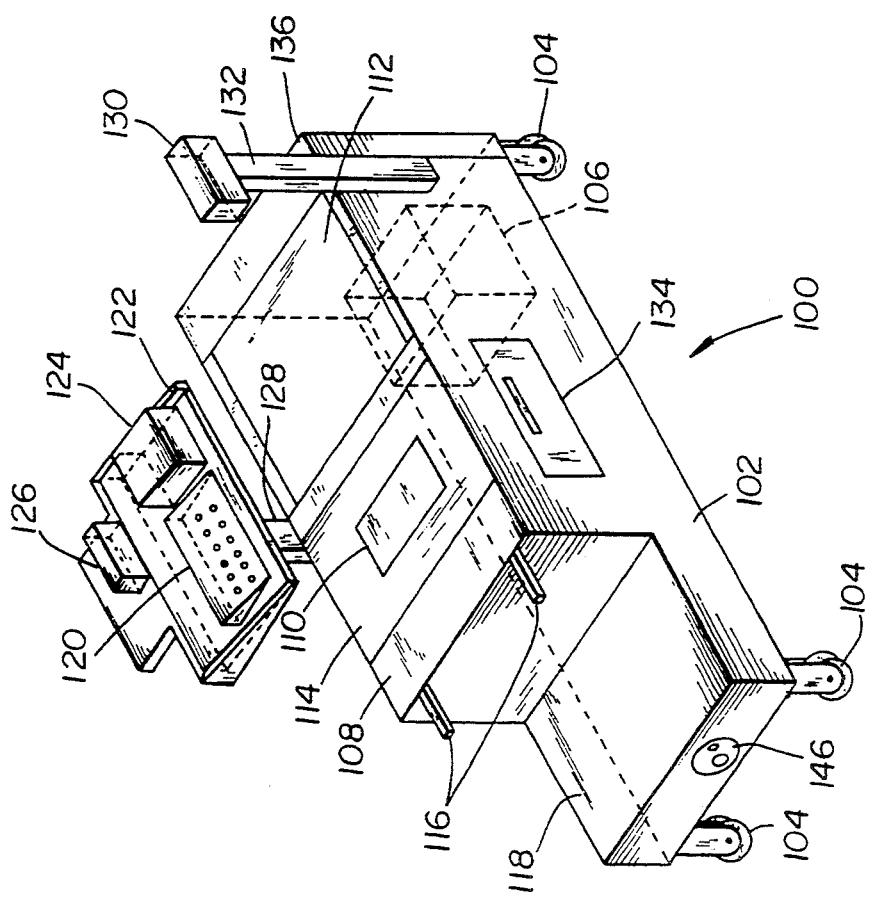
FIG. 8 is a perspective view of another mobile checkout stand for use with a laser scanner.

FIGS. 8 and 9 illustrate another mobile checkout stand 100 in which the aforementioned scanning arrangement or module is incorporated, together with other point-of-transaction accessories. The stand 100 includes a wheeled carriage 102 having swivel castors 104 which enable the stand to be easily moved from location to location. The castors 104 may have a locking mechanism to fix the stand at any desired location. The scanning arrangement, together with the signal processing circuitry and microprocessor control circuitry described above, are mounted in a terminal 106 underneath a countertop 108 in which a window 110 is mounted. The arrangement directs the scanning beam through the window 110 over which the products to be processed are conveyed. A conveyor drive belt 112 moves the products to the window 110.

Stand 100 further includes a scale 114 for weighing those products whose purchase price is a function of their weight. A set of bag supports 116 extends outwardly of the stand to suspend shopping bags in an upright position above a support shelf 118.

A keyboard 120 for entering data, a printer 124 for printing written receipts, and a credit card reader 126 for processing electronic payments are all mounted on another shelf 122 which is mounted for sliding movement along an upright column 128. A display 130 for displaying transaction data is mounted on another sliding column 132. A cash drawer 134 is used for processing cash payments. A storage cover assembly 136 is mounted at one end of the stand.

When not used as a checkout stand, the cover assembly 136 is moved to overlie the countertop 108. Before doing so, the shelf 122 and the components 120, 124, 126 thereon are removed from the column 128; the display 130 is removed from the column 132; and the columns 128 and 132 are lowered. The cover assembly consists of two telescoping parts 140, 142 which overlie the entire countertop. Cover part 140 further includes a latch mechanism 144 for locking the cover assembly in place. With the cover in place, as shown in FIG. 9, the stand can be used as a merchandise display counter.

A power input receptacle 146 for AC power is used to power the various electronic components. Communication from the terminal 106 to a remote host computer is achieved through either detachable wiring and/or through radio frequency transmission to a remote receiver.

It will be understood that each of the elements described above, or two or more together, also may find a useful application in other types of constructions differing from the types described above.

While the invention has been illustrated and described as embodied in a mobile point-of-sale supermarket check-out system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A mobile, point-of-transaction system for processing items, comprising:
    (a) a wheeled carriage for transporting the system from location to location;
    (b) a scanning terminal mounted on the carriage for joint movement therewith, and operative for electro-optically reading coded indicia on items presented to the terminal, and for determining transaction data for the items;
    (c) transaction means responsive to the terminal and also mounted on the carriage for joint movement therewith, and operative for processing the transaction data for the items to complete the transaction; and
    (d) means for reconfiguring the mobile, point-of-transaction system as a display stand having a display surface during a period of relatively less intense usage;
    wherein (i) said transactional means are located on a shelf overlying said carriage and mounted on a slidable column above said carriage and (ii) said configuring means includes means for detaching said shelf from said column, means for supporting said detached shelf together with said transactional means at a location beneath said display surface within said carriage and a passage for lowering said slidable column into said carriage.

2. The system according to claim 1, wherein the carriage has a countertop and a window mounted on the countertop, and wherein the terminal includes means for scanning a light beam in a scan pattern through the window.

3. The system according to claim 1; and further comprising means, on-board the carriage, for manually entering data relating to an item being processed.

4. The system according to claim 1; and further comprising means, on-board the carriage, for displaying data relating to the item being processed.

5. The system according to claim 1; and further comprising means, on-board the carriage, for weighing the item to obtain a weight for an item being weighed.

6. The system according to claim 1, wherein the transaction means, on-board the carriage, includes means for printing a receipt of the transaction.

7. The system according to claim 1, wherein the transaction means, on-board the carriage, includes means for processing electronic payment for the items.

8. The system according to claim 1, wherein the transaction means, on-board the carriage, includes means for processing cash payment for the items.

9. The system according to claim 1; and further comprising means, on-board the carriage, for holding a bag in an upright orientation.

10. The system according to claim 1; and further comprising a handle for enabling a person to push the carriage.

11. The system according to claim 1; and further comprising a keyboard for manually entering data relating to an item being processed, a display for displaying data relating to the item being processed, means for mounting the keyboard and the display for movement to a stored position, and means for storing the keyboard and the display in the stored position.

12. A method for operating a point-of-transaction system to efficiently use areas of a store during periods of differing intensity of usage, wherein said system is carried by a fixture, the method comprising the steps of:
during a period of relatively intense usage, placing the fixture at a prescribed area of the store and configuring the point-of-transaction system with point-of-transaction terminal components for processing items to be purchased by customers; and
during a period of relatively less intense usage, reconfiguring the fixture as a display stand by relocating at least some of said point-of-transaction components from the fixture, and overlying remaining point-of-transaction components of said fixture with a display surface;
wherein (i) said components are located on a shelf overlying said fixture, and said reconfiguration includes repositioning said shelf together with said remaining components to a location beneath said display surface within said fixture and (ii) said shelf is mounted on a slidable column above said fixture, and said step of reconfiguring includes detaching the shelf from said column, followed by lowering said slidable column into said fixture.

13. The method of claim 12, further including moving the system to another area of the store during a period of relatively less intense usage.

14. The method of claim 13, wherein said fixture is wheeled and located or relocated by wheeling between prescribed areas of the store.

15. The method of claim 12, including linking said point of transaction terminal to a central terminal having a data base.

16. The method of claim 12, wherein said step of configuring includes exposing said components to use by a human operator.

17. The method of claim 16, wherein said step of reconfiguring includes covering said components to present said overlying display surface.

18. The method of claim 12, wherein said step of reconfiguring includes covering said components to present said overlying display surface.

* * * * *